Nov. 27, 1934.   J. DERRY   1,982,576
MOLDING PRESS
Filed Dec. 12, 1931   3 Sheets-Sheet 1

Inventor:
Jasper Derry,
Emery, Booth, Varney & Townsend
Attys

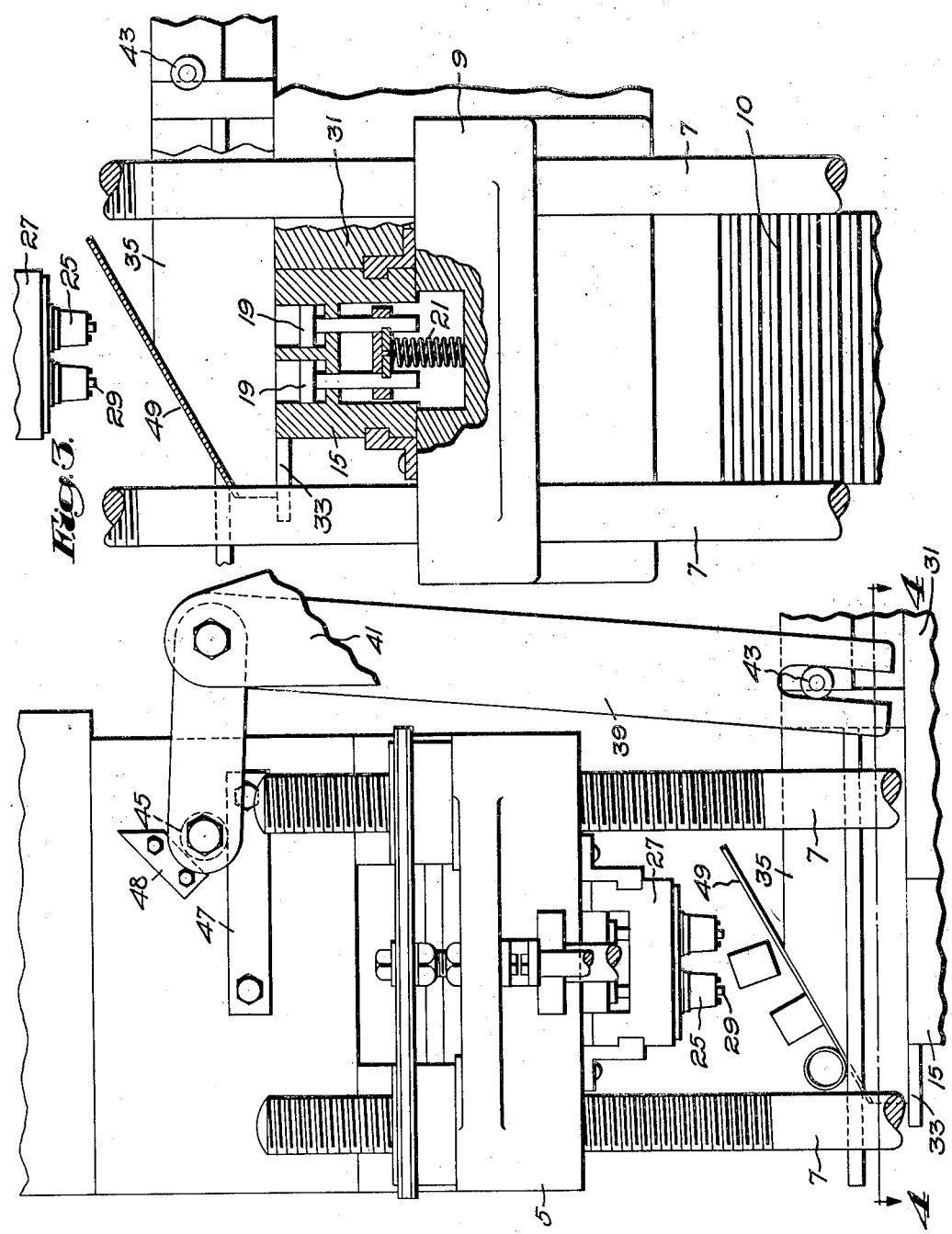

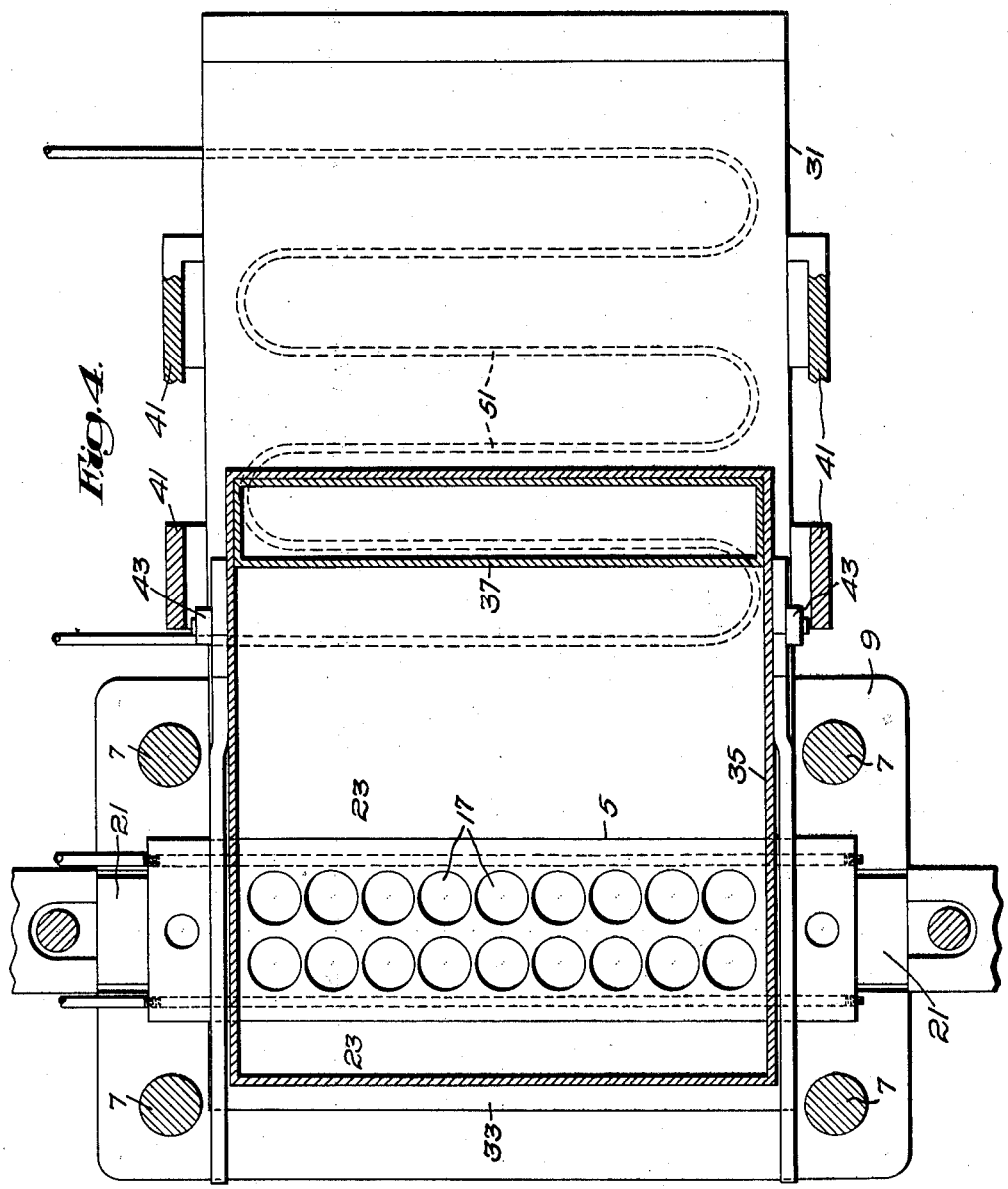

Patented Nov. 27, 1934

1,982,576

UNITED STATES PATENT OFFICE 1,982,576

MOLDING PRESS

Jasper Derry, Medford, Mass., assignor to Andrew Terkelsen, Newton, Mass.

Application December 12, 1931, Serial No. 580,563

4 Claims. (Cl. 18—17)

This invention relates to molding presses and in its more particular aspect to those presses in which articles are compressed from material, such as phenolic condensation products, which is supplied to the presses in the form of an incoherent powder which is caused to coalesce in the molds under heat. This operation is sometimes referred to as synthetic hot molding. My invention more particularly relates to mechanism for feeding material and in particular such powdery material to the molds.

My invention will be well understood by reference to the following description of a single illustrative embodiment thereof shown by way of example in the accompanying drawings, wherein:—

Fig. 2 is a partial side elevation on an enlarged scale with the parts in open position showing the upper die and the feed box;

Fig. 3 is a similar view showing the feed box and the lower die with parts in section; and Fig. 4 is an enlarged horizontal section substantially on the line 4—4 of Fig. 2.

Figure 1:
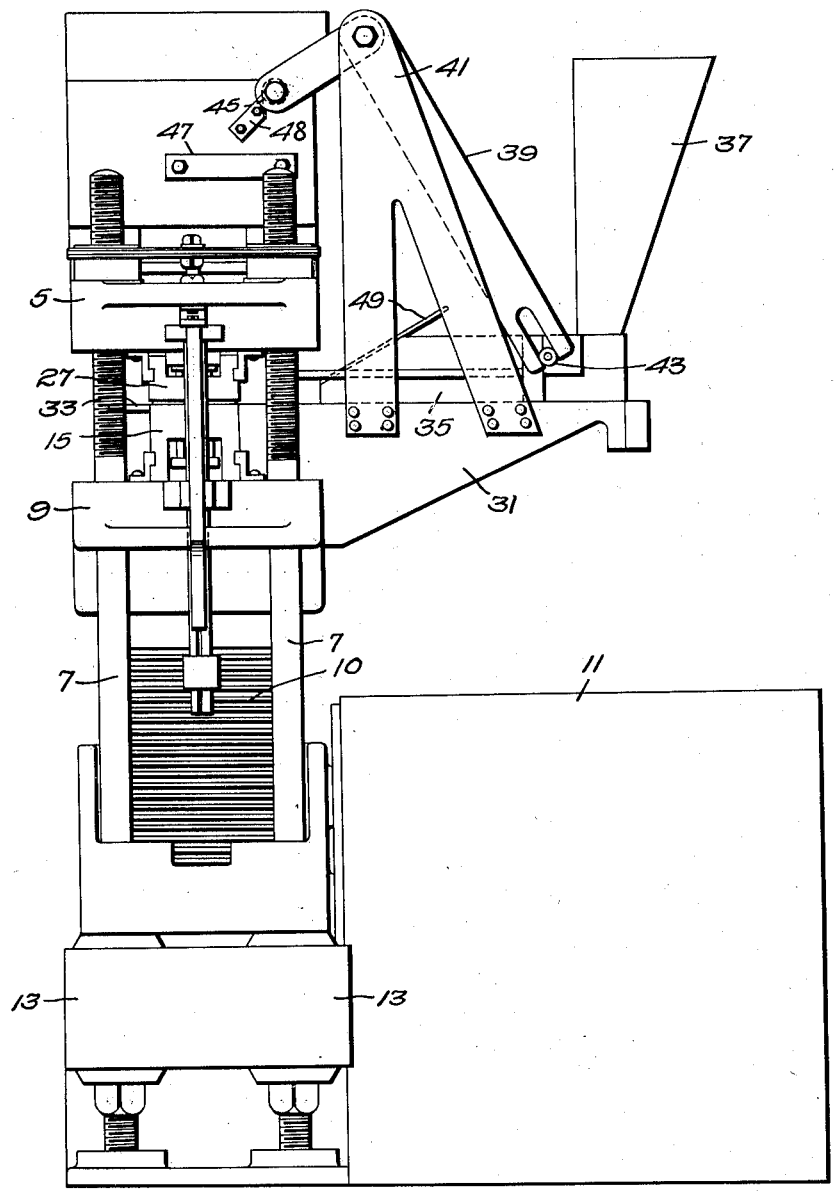
Fig. 1 is a side elevation of the press in closed position.

Referring first to Fig. 1 of the drawings, I have there shown a molding press of well known type embodying a bed 5 carried by rods 7 on which reciprocates the travelling ram 9. The ram is herein shown as moved upwardly against the bed by means of the rack 10 depending therefrom adapted to be driven by suitable pinions rotated through intermediate gearing by an electric motor. The last-mentioned parts are not shown, being enclosed in the casing 11. As the ram 9 completes its travel it raises bed 5 against the resistance of heavy springs surrounding the rods 7 and housed in the bottom of the press at 13, these springs acting as an accumulator which maintains the pressure and follows up the physical changes or contraction in the material during the curing process. A desired dwell is provided in the motion of the ram while the material cures or "cooks" and during this period the motor is not used to deliver any power. At the conclusion of this period of dwell the ram is retracted, the molded pieces of work are discharged and fresh material is supplied to the molds. I have thus briefly described the type of press shown which is not novel to this application and therefore does not require extended description.

Herein I have illustrated the press as equipped for the production of tube bases for so-called vacuum tubes or electron tubes. Supported on the ram 9 is the lower die 15 which (see Fig. 4) is provided with a multiplicity of mold cavities 17 having movable bottoms 19 supported from the yieldably mounted bar 21. To heat the material the lower die may be provided with the steam passages 23 extending adjacent the mold cavities 17. Cooperating male parts 25 are carried by the upper die 27 supported on bed 5. The completed work is stripped from the molding forms 25 by means of the plungers 29. The parts just described serve as examples of the molding mechanism which may be of any known or suitable construction.

In the practical art hitherto such mold cavities as have been described have been fed by hand, the operator depositing in each cavity a spoonful of powder or a preformed and partially cured pellet or briquette. Attempts have been made to automatically feed the material to the molds, but no practical feeding means has been provided. In the embodiment of my invention herein shown I provide a suitable supporting table 31 carried by the ram 9 and extending laterally of the lower die 15, its upper surface being a continuation of the upper face of that die. A further continuation on the other side may be provided by means of the shelf 33. Working on this table and normally supported thereon to be moved thence over the mold cavities in the die 15 is a feed box 35. As best seen in Figs. 3 and 4, this feed box may take the form of an open-bottomed frame, the capacity of which is greatly in excess of the combined capacities of the cavities 17 and the bottom of which provides a discharge opening covering and encompassing the group of cavities and of an area greatly exceeding the areas of the open tops of these cavities. To facilitate maintaining a supply of powder in this feed box which, as will be seen, is in the nature of a reservoir instead of a mere transferring mechanism, I may provide on the outer end thereof the hopper 37.

The feed box may be reciprocated in any convenient manner to bring it over the mold cavities when the press is open, and herein I have shown bell-crank levers 39 pivoted to brackets 41 rising from the table and having one arm forked and engaging a stud 43 on the side of the feed box. The other arm carries the follower roll 45 adapted to engage the fixed abutments or tracks 47 and 48 at the upper part of the bed 5. It will be apparent from Fig. 1 that as the ram 9 falls and the press opens, the follower 45 will engage abutment 47 and then roll along the same to the left swinging the bell-crank clockwise and moving the feed box inwardly and that when the press recloses roll 45 will move from left to right along the bottom of abutment 48 to swing the bellcrank contra-clockwise to retract the box.

To avail of this driving motion and also to save time on the cycle, avoiding any substantial stoppage of the motion of the ram in its lowermost position, the forward end of the feed box (see Figs. 2 and 3) may be provided with a slanting roof 49 presented beneath the upper die. When the completed molded articles are stripped from the upper mold parts 25 by means of the plungers 29, they fall on this slanting surface 49, as indicated in Fig. 2, and roll or slide down the same and are discharged laterally of the press. It will be noted that in the construction described a large body of powder is carried by the feed box and rolled or worked over the open faces of the cavities in such manner as certainly and completely to fill the same. There is nothing to plug up and no mechanism requiring accurate alignment or rapid transfer.

The motion of the box should be without substantial dwell in the forward position to prevent curing of the powder on the hot face of the lower die. The feeding of the powder from the open bottom of a large magazine permits this motion while ensuring filling of the mold cavities. The provision of slanting roof 49 as described facilitates this motion.

I find it advantageous in the case of the powdered synthetic materials referred to to preheat the same in the feed box 35, and herein (see Fig. 4) I have shown steam passages 51 beneath table 31 to preheat the body of powder in the hand feed box 35. It seems probable that in the hand feeding of molds as hitherto practiced the necessary slowness of the operation provided for preheating the powder in the die prior to the actual pressing operation. In the case of briquettes these received a preliminary heating in the course of their manufacture. In the present embodiment of the invention the large volume of powder in the feed box 35 and the constant rolling over movements of the same as the box reciprocates provides for uniform heating and prevents any undesired agglomeration of the material prior to molding.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a press for hot synthetic molding, in combination with the die having a plurality of relatively isolated mold cavities therein, a feed box having a permanently open bottom opposing said cavities collectively and of a capacity to contain a volume of powder sufficient for repeated charges of said cavities, a table lateral to the die, means for preheating the table, and means to move said box from and to the table over and from said die.

2. In a press for hot synthetic molding, in combination with a die having a mold cavity therein, an extended surface adjacent thereto, means to heat the same, a feed box of a capacity to contain a large volume of material greatly in excess of the capacity of the mold, said box being normally positioned over said surface, and means to move the same at intervals over the die.

3. In a molding press, in combination with a lower die having a mold cavity and a cooperating upper die having a complementary mold part, means to strip the molded article from said cooperating part, and a feed box movable over said lower die having a sloping roof to receive and discharge the detached article.

4. In a press for hot synthetic molding, in combination with the die having a mold cavity therein, a feed box of a capacity to contain a volume of material sufficient for numerous charges of said mold and having a permanently open bottom of markedly greater area than the top of said cavity, a table lateral to the die, means for preheating the table, and means to move said box from and to the table over and from said die.

JASPER DERRY.